(12) United States Patent
Yates

(10) Patent No.: US 7,410,152 B2
(45) Date of Patent: Aug. 12, 2008

(54) GASEOUS FUEL AND AIR MIXING VENTURI DEVICE AND METHOD FOR CARBURETOR

(75) Inventor: Kristian W. Yates, Escondido, CA (US)

(73) Assignee: Continental Controls Corporation, San Diego, CA (US)

( * ) Notice: Subject to any disclaimer, the term of this patent is extended or adjusted under 35 U.S.C. 154(b) by 125 days.

(21) Appl. No.: 11/537,012

(22) Filed: Sep. 29, 2006

(65) Prior Publication Data

US 2007/0074452 A1    Apr. 5, 2007

Related U.S. Application Data

(60) Provisional application No. 60/722,113, filed on Sep. 30, 2005.

(51) Int. Cl.
*F02M 19/10*    (2006.01)

(52) U.S. Cl. ................ 261/23.2; 261/118; 261/DIG. 12

(58) Field of Classification Search ................ 261/23.2, 261/115–118, DIG. 12, DIG. 56
See application file for complete search history.

(56) References Cited

U.S. PATENT DOCUMENTS

| | | | | |
|---|---|---|---|---|
| 1,631,716 | A | * | 6/1927 | Baverey .................... 261/41.5 |
| 2,039,353 | A | * | 5/1936 | Seidel ........................ 261/18.3 |
| 2,857,145 | A | * | 10/1958 | Morris ...................... 261/23.2 |
| 2,939,775 | A | | 6/1960 | Middleton et al. |
| 3,123,451 | A | | 3/1964 | Baverstock |
| 3,545,948 | A | | 12/1970 | Bayerstock |
| 3,843,338 | A | * | 10/1974 | Zonker et al. .............. 48/180.1 |
| 4,073,832 | A | * | 2/1978 | McGann ...................... 261/118 |
| 4,308,843 | A | | 1/1982 | Garretson |
| 4,335,697 | A | | 6/1982 | McLean |
| 4,375,438 | A | * | 3/1983 | McKay ...................... 261/23.2 |
| 4,387,685 | A | * | 6/1983 | Abbey ........................ 123/439 |
| 4,387,689 | A | | 6/1983 | Brown |
| 4,425,140 | A | | 1/1984 | Lassanske et al. |
| 4,425,898 | A | | 1/1984 | McLean |
| 4,479,466 | A | | 10/1984 | Greenway et al. |
| 4,894,067 | A | | 1/1990 | Bayerstock |

(Continued)

OTHER PUBLICATIONS

Mixing Venturi VM-350 (also known as FMV6), Continental Controls Corporation, published 2003.

(Continued)

*Primary Examiner*—Richard L Chiesa
(74) *Attorney, Agent, or Firm*—Procopio, Cory, Hargreaves & Savitch LLP

(57) ABSTRACT

A gaseous fuel and air mixing venturi device adapted for retrofitting in a carburetor has a venturi body with a passage for air flow through the body, the passage having a throat of reduced cross-sectional area. The body has an axial fuel inlet port at a first end and fuel supply ports connected to the fuel inlet port and spaced around the throat for supplying fuel to the air flow passage for mixing with air flowing through the passage. The first end of the venturi body has mating seating formations for seating against corresponding seating surfaces of a gaseous fuel carburetor after removal of a spring mass air/fuel mixing section, and a fastener mechanism for releasably securing the venturi body in the carburetor, with the fuel supply port of the carburetor connected to the fuel inlet port of the venturi body.

17 Claims, 11 Drawing Sheets

U.S. PATENT DOCUMENTS

| | | | | |
|---|---|---|---|---|
| 4,966,735 A | * | 10/1990 | LoRusso | 261/40 |
| 4,997,458 A | | 3/1991 | Jones | |
| 5,070,851 A | | 12/1991 | Janisch | |
| 5,311,849 A | | 5/1994 | Lambert et al. | |
| 5,807,512 A | * | 9/1998 | Grant | 261/23.2 |
| 5,863,470 A | * | 1/1999 | Grant | 261/23.2 |
| 5,916,831 A | | 6/1999 | Jager et al. | |
| 6,026,787 A | | 2/2000 | Sun et al. | |
| 6,120,007 A | * | 9/2000 | Grant | 261/23.2 |
| 6,371,092 B1 | | 4/2002 | Guglielmo et al. | |
| 7,097,162 B2 | | 8/2006 | Ichihara et al. | |

OTHER PUBLICATIONS

Gas and Air Mixers, Heinzmann GmbH, date unknown.
Gas Mixer D100, Woodward Automotive Products, date unknown.

* cited by examiner

GASEOUS FUEL AND AIR MIXING VENTURI DEVICE AND METHOD FOR CARBURETOR

RELATED APPLICATION

The present application claims priority to U.S. provisional patent application Ser. No. 60/722,113 entitled GASEOUS FUEL AND AIR MIXING ADAPTER DEVICE FOR CARBURETOR of concurrent ownership, filed on Sep. 30, 2005, which is incorporated herein by reference in its entirety.

BACKGROUND

1. Field of the Invention

This invention relates generally to devices for mixing gaseous fuel and air in the correct proportions for combustion in a gas engine, and is particularly concerned with a venturi mixing device for replacing the spring mass, diaphragm actuator of existing gaseous fuel carburetors for natural gas engines and the like, and with a method of retrofitting a carburetor with such a device.

2. Related Art

The majority of gaseous fuel carburetors for internal combustion engines have an air/fuel mixing section which is comprised of a spring mass system. This has the potential to create unstable engine performance due to interaction with the upstream pressure regulator or emissions control valve. The carburetor was originally designed to run open loop with a mechanical upstream pressure regulator, and on applications that did not have strict emissions requirements. In recent years emissions requirements have become very strict, and more sophisticated upstream air/fuel ratio controls have either replaced the mechanical pressure regulator entirely or supplement its operation. These devices are typically electromechanical and respond to the commands of a computer controller using a closed loop control strategy, based on the output of an oxygen sensor, located in the exhaust stream of the engine. These new systems can respond very quickly and often create unstable interactions between the carburetor and the upstream fuel valve. This interaction is possible because the air/fuel mixing section of the carburetor is comprised of a dynamic spring mass system There are several existing types of gaseous fuel carburetors and the majority use a diaphragm to actuate the air fuel mixing section against the force of a spring. The smallest model eliminates the diaphragm and uses a piston as the operator. The diaphragm is typically an elastomer coated fabric and is susceptible to chemical and thermal degradation, rupture due to engine backfiring, abrasive damage, and the like. The air/fuel mixing section of the carburetor also has sliding surfaces that are prone to wear. Down time of an engine due to required maintenance in an industrial application, such as a pump on an oil pipeline, can result in the loss of thousands of dollars from lost production.

Another deficiency of known gaseous fuel carburetors is the limited ability to thoroughly mix the air and fuel together. The fuel is introduced into the center of the air stream from a single location. This can create a lean mixture at the outer edges of the flow stream and a richer mixture in the center. This makes it more difficult for the engine to completely burn all incoming fuel, which often results in higher exhaust emissions and a reduction in horsepower.

The limited number of existing gaseous fuel carburetor models and sizes may require the user to install a unit that is too large for the application. A carburetor excessively large for an engine may cause starting troubles. If certain application parameters change significantly, such as fuel composition, the user may be required to change to a different model of carburetor and modify the associated plumbing and linkage of the engine.

Venturi mixers have been developed for gaseous-fueled engines in order to overcome some of the problems of the existing gaseous fuel carburetors with a spring-mass system forming the air/fuel mixing section. One example is the FMV6 Mixing Venturi manufactured by Continental Controls Corporation of San Diego, Calif. Other such devices are manufactured by Woodward and Heinzmann. These mixers are not installed in the existing carburetor. Instead, they replace the carburetor entirely, which often creates substantial installation difficulties and costs. The physical envelope of these mixers is typically very different from the existing carburetor. This requires major modifications to the engine's air intake system, which could result in thousands of dollars of lost production time. Another major deficiency is that these mixers do not include a butterfly for controlling the air/fuel mixture to the engine. In some instances the existing butterfly is separable from the carburetor and can be used with custom adapters. If the butterfly is not separable from the carburetor, a new butterfly may have to be purchased. If the location of the butterfly is different from the previous installation, additional changes to the governor linkage will be required. An additional mixture screw will also be required. Conventional retrofit difficulties increase significantly when the engine uses more than one carburetor, which is often the case.

Therefore, what is needed is a system and method that overcomes these significant problems found in the conventional systems as described above.

SUMMARY

According to one embodiment, a gaseous fuel and air mixing venturi insert device is retrofitted into an existing gaseous fuel carburetor, replacing the conventional spring mass air/fuel mixing section of the carburetor. In one embodiment, the mixing adapter or venturi insert device has a venturi body with a passage for air flow through the venturi body, the passage having a throat portion of reduced cross-sectional area. The body has an axial fuel inlet port at the first end and a plurality of fuel supply ports connected to the fuel inlet port and spaced around the throat portion for supplying fuel to the air flow passage for mixing with the air flowing through the passage. The fuel inlet port has an adapter for sealing engagement with the fuel port of a gaseous fuel carburetor, and the first end of the venturi body has mating seating formations for seating against corresponding seating surfaces of a gaseous fuel carburetor after removal of a spring mass air/fuel mixing section. A fastener mechanism releasably secures the venturi body to a gaseous fuel carburetor in place of the standard spring mass air/fuel mixing section.

The adapter in one embodiment is a fuel stem arranged for sealing engagement with the fuel port of the carburetor when the body is secured on the carburetor in place of the removed air/fuel mixing section. A biasing device may be positioned between the fuel stem and venturi fuel inlet port.

The venturi insert device replaces the conventional spring mass air/fuel mixing section of a gaseous fuel carburetor, such as a natural gas carburetor, and eliminates all moving parts in the air/fuel mixing section of the carburetor. The insert device in one embodiment is designed to maintain a near stoichiometric mixture throughout the operating range of the engine. Some applications, such as lean burn engines, require a venturi insert sized to run at an air/fuel ratio other than stoichiometric. Final corrections to the air/fuel ratio are made by the upstream air/fuel ratio controller. The venturi insert has a multitude of fuel inlet passages evenly dispersed throughout the low-pressure region of its throat. The fuel is more evenly distributed across the flow profile resulting in a more homogenous air/fuel mixture entering the engine.

According to another aspect, a method is provided for retrofitting a carburetor by replacing the existing spring mass air/fuel mixing section of the carburetor with a venturi insert device. The fasteners attaching the spring mass air/fuel mixing section in the carburetor are released and the air/fuel mixing section is removed. The venturi insert device is then placed into the cavity left by removal of the old air/fuel mixing section, aligning a fuel stem of the insert device with the fuel port of the carburetor butterfly assembly and securing a flange of the venturi insert device to a flange of the carburetor body.

The airflow and fuel flow area of the venturi insert can be modified to fit the application specifically and provide a multitude of sizing options for each model of carburetor. Alternatively the customer could simply install the correct size venturi insert into the existing carburetor. The venturi insert uses the existing mixture screw and butterfly throttle assembly of the carburetor. The cost savings for labor, materials, and down time are substantial. The venturi insert improves the performance of diaphragm operated carburetors used on internal combustion engines, by completely replacing the problematic spring mass, diaphragm actuator of existing gaseous fuel carburetors. Different venturi insert configurations are designed for specific models of carburetor such that the venturi insert device is relatively simple to install and does not require the user to make any changes to the existing fuel system plumbing. The various configurations may have significant differences in size and shape, but they all utilize a venturi air passage to draw fuel into the air stream. In an effort to improve the air and fuel mixing of existing carburetors, all configurations have a multitude of fuel inlet passages evenly dispersed throughout the low-pressure region of the venturi.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a venturi insert device for mounting in a carburetor body, and a retrofit method for replacing an existing gaseous fuel and air mixing device in a carburetor with the venturi insert device.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 4:
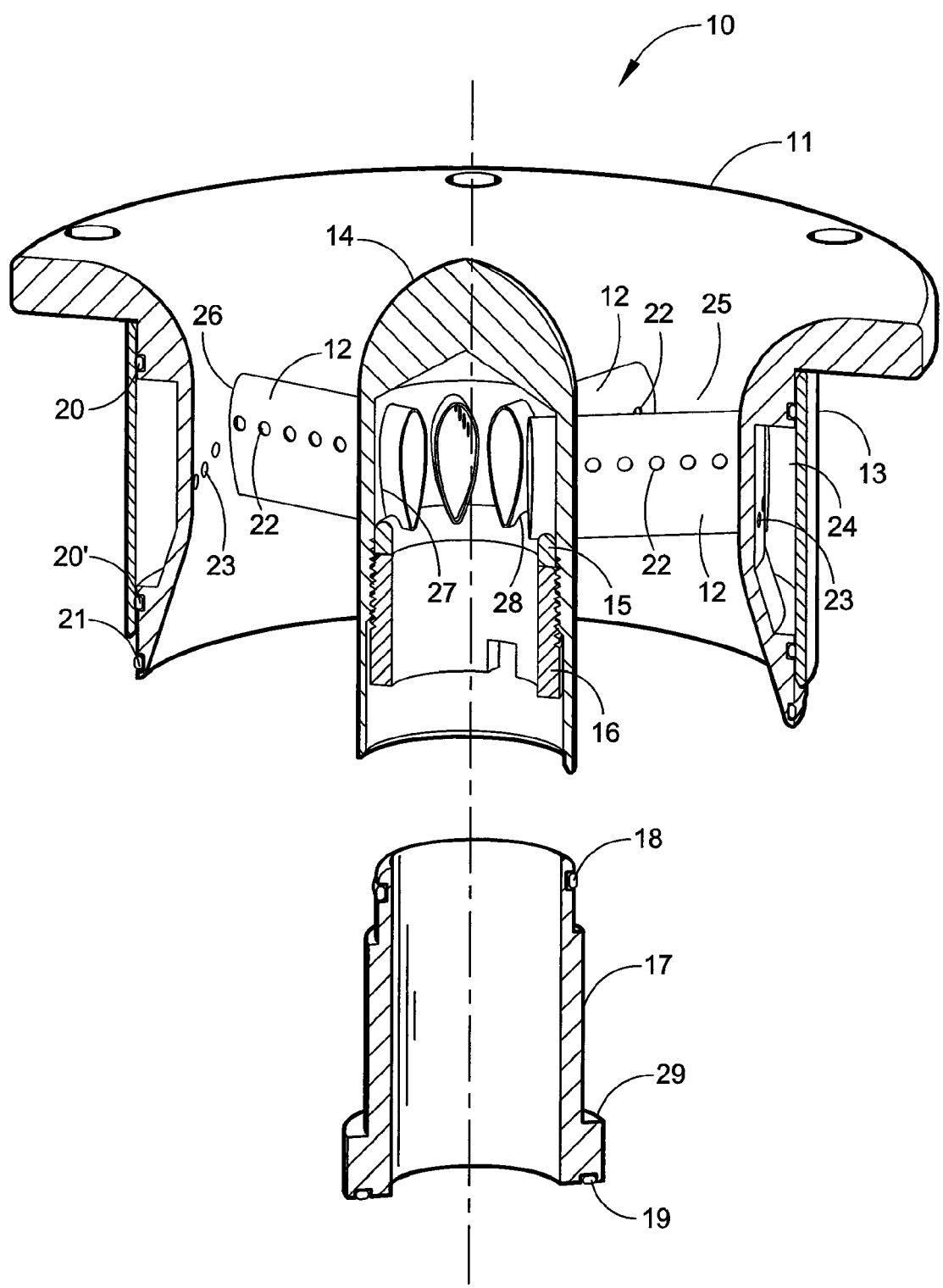
FIG. 4 is a cross-section on the lines 4-4 of FIG. 2, again showing the fuel stem separated from the remainder of the body.
Figure 5:
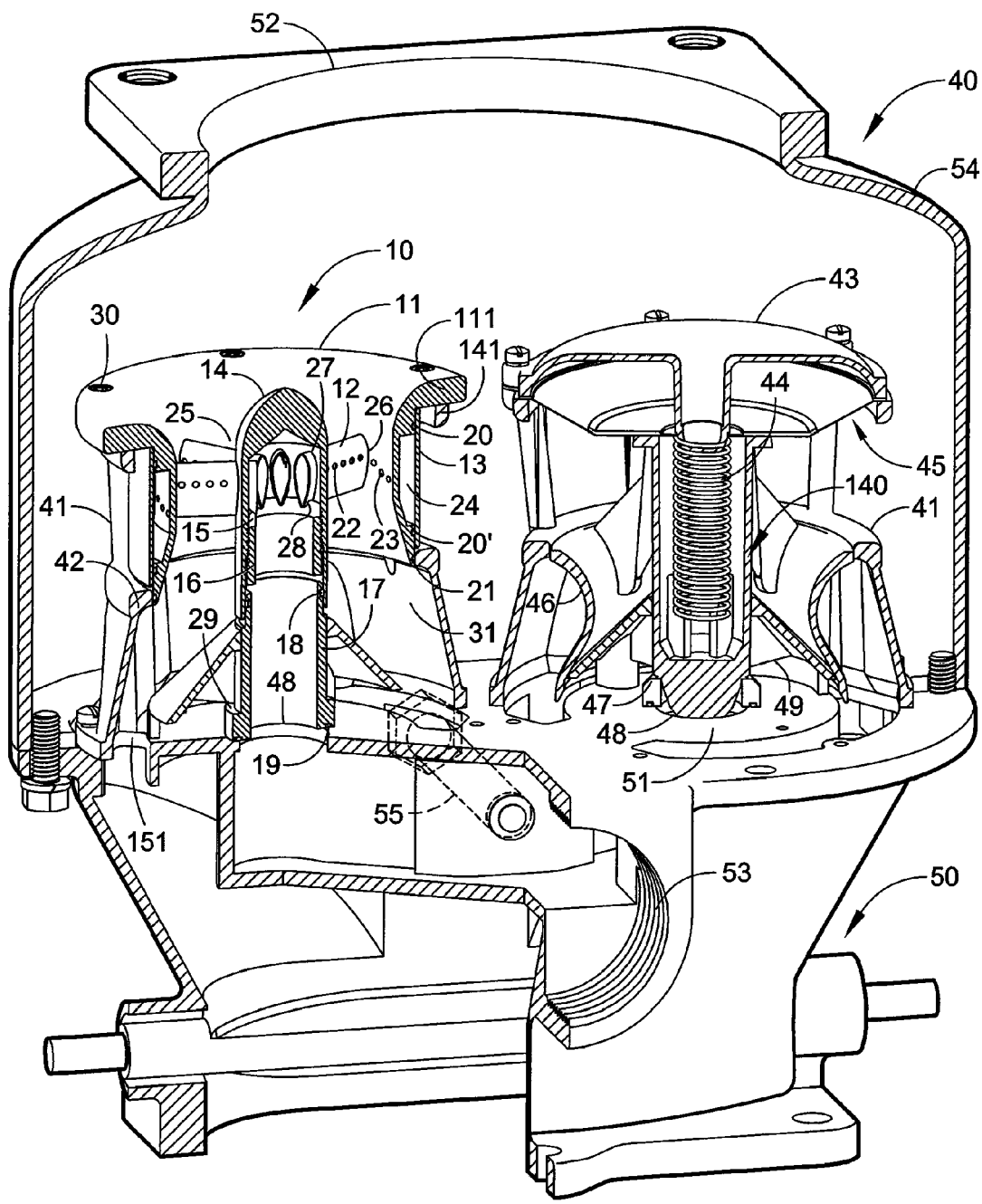
FIG. 5 is a cross-sectional view of a gaseous fuel carburetor housing with the venturi insert or adapter device of FIGS. 1 to 4 replacing one of the air/fuel mixers, with a conventional air/fuel mixer shown on the right hand side for comparison purposes.

FIGS. 1 to 4 of the drawings illustrate a gaseous air and fuel mixing venturi insert device 10 according to an exemplary embodiment of the invention for replacing a conventional fuel and air mixing device of a gaseous fuel carburetor 40, while FIG. 5 illustrates how the insert device is installed in such a carburetor. The carburetor in the embodiment of FIG. 5 is an Impco 600D carburetor as manufactured by Impco Technologies, Inc. of Cerritos, Calif. which has two housings or seating recesses 41 for holding air/fuel mixing devices. However, it will be understood that the venturi insert device 10 may be modified for installation in other known carburetors in an equivalent manner in other embodiments, such as the carburetor described in U.S. Pat. No. 3,545,948 of Baverstock which has only one air/fuel mixing device and corresponding seating recess.

FIG. 5 is a sectional view of carburetor 40, which has two fuel and air mixing devices. For illustration purposes, the left side of FIG. 5 shows the venturi insert device 10 of FIGS. 1 to 4 installed and the right side shows a standard spring mass/diaphragm mixing device 140 mounted in seat 41 prior to removal and installation of a second venturi insert device 10.

Figure 1:
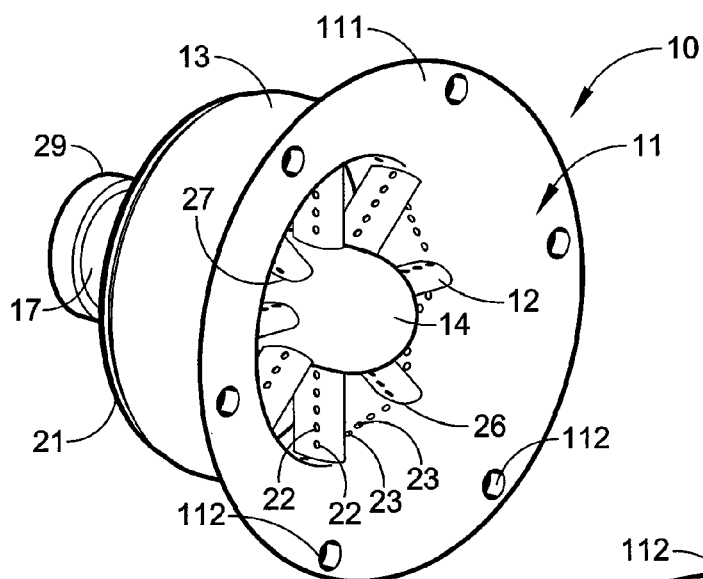
FIG. 1 is a perspective view of a gaseous air and fuel mixing venturi insert device for a gaseous fuel carburetor according to a first embodiment.
Figure 2:
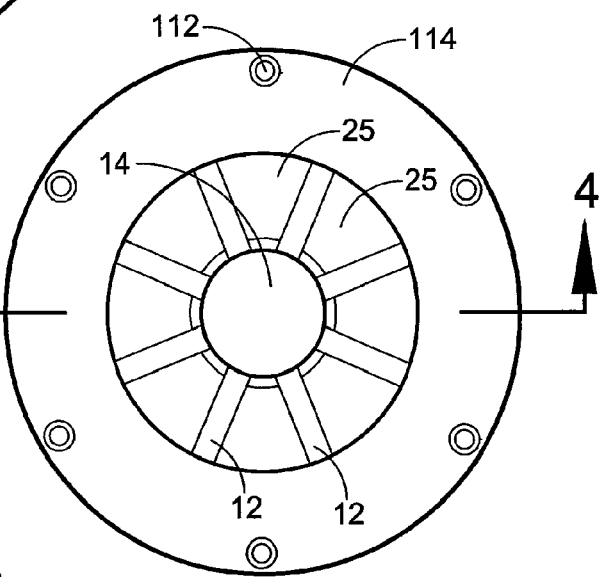
FIG. 2 is a front view of the device of FIG. 1.
Figure 3:
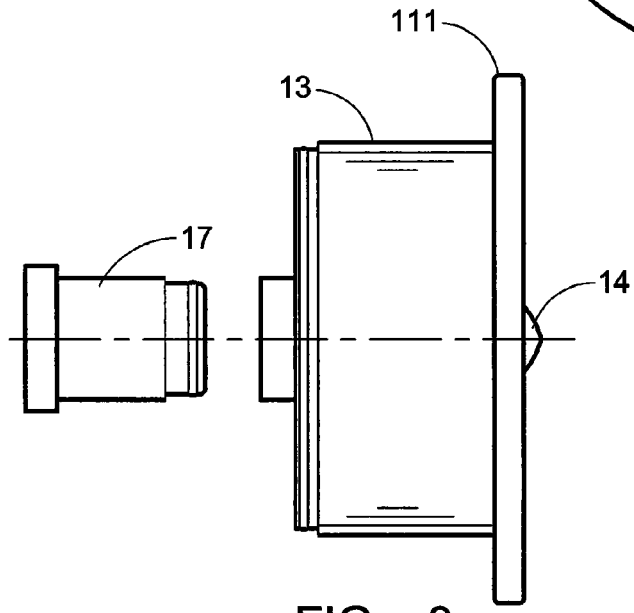
FIG. 3 is a side elevation view of the device showing the fuel stem separated from the remainder of the venturi body.

The venturi insert device 10 of FIGS. 1 to 4 basically comprises a venturi body 11 having an outer sleeve portion 114 and a hub 14 concentrically located within the outer portion of the venturi body 11, and a fuel stem 17 formed separately from the venturi body. A series of spaced, hollow spray bars 12 extend radially from the hub 14 out to the outer sleeve portion 114 of the venturi body 11. The spray bars 12 are pressed through slots 26 in the outer sleeve portion 114 and slots 27 in the hub 14 (FIGS. 1 and 4). Slots 26 and 27 have the same profile as spray bars 12 and provide an intimate fit. Spray bars 12 are secured by the retainer 15, which engages notches 28 of spray bars 12, as best illustrated in FIG. 4. Retainer 15 is held in place by the retainer nut 16 and the resulting assembly is made rigid by tightening retainer nut 16 until retainer 15 has firmly seated into the notches 28 of all spray bars 12. An outer cover sleeve 13 slides over outer sleeve portion 114 of venturi body 11 and is held in place by o-rings 20,20' engaging in annular grooves in the sleeve portion 114 to form an annular fuel supply chamber 24 between the cover sleeve 13 and outer sleeve portion 114. O-rings 20,20' seal the annular chamber and restrict gaseous fuel from leaking from the chamber and air from entering the chamber. Venturi body has an outwardly projecting flange 111 at one end, adjacent to cover sleeve 13. Flange 111 has a plurality of spaced fastener openings 112.

Venturi body 11 has a plurality of ports 23 extending at spaced intervals around a ring at an intermediate point in its length. Ports 23 communicate with annular chamber 24, as best seen in FIG. 4. Spaced ports 22 are also provided along each side of each of the spray bars 12, as seen in FIGS. 1 and 4. The chamber 24 created between venturi sleeve 13 and venturi body 11 provides a means of transporting fuel from spray bars 12 to fuel ports 23 of venturi body 11. Thus, fuel sprays out of ports 22 and 23 into the venturi passageway 25 in the spaces between the spray bars (see FIG. 2). The hub 14 is open at its lower end and engages over the upper end of the hollow cylindrical fuel stem 17 on installation in carburetor housing, as described in more detail below in connection with FIG. 5. The open, exit end of the venturi passageway through the venturi body 11 communicates with the outlet 151 of the carburetor which is normally the stock carburetor butterfly assembly, although it may be an after market butterfly assembly in some embodiments. Once the venturi insert device 10 is installed in the carburetor 40, axial movement of sleeve 13 is limited by the surface 42 of the support member 41. The venturi body 11 and the fuel stem 17 together form mating seating formations for seating against the corresponding surface of the carburetor housing, as described in more detail below.

Before installing the venturi insert device 10 into the carburetor 40, the user removes the existing air-mixing device 140, specifically the cover 43, the spring 44, the diaphragm assembly 45, and air/fuel valve 46. The support or housing 41 for seating the air/fuel mixing device is also removed, along with valve seat 47. Valve seat 47 is shown on the right hand side in FIG. 5 prior to removal. Next, the fuel stem 17 is concentrically located with the fuel port 48 of the butterfly assembly 50. Support member 41 is then reinstalled and secured in position over the lower part or butterfly assembly 50 of the carburetor by fastener devices such as screws. Flange 29 at the lower end of fuel stem 17 is now securely clamped between surface 51 of butterfly assembly 50 and surface 49 of support member 41. Next the venturi body 11 is installed into housing 41 and over fuel stem 17, with the open lower end of the hub 14 sliding over the reduced diameter upper end of the fuel stem 17. The upper or outer flange 111 of the venturi body 11 is secured to the upper flange or seating rim 141 of support member or housing 41, with fastener openings 112 aligned with corresponding openings in carburetor flange 144. Screws 30 are secured through the aligned openings to hold the parts in place. The lower rim of the venturi body 11 seats against the flange 42 of support member 41, with O-ring seal 21 providing a seal between flange 42 and the lower rim of the venturi body 11.

The O-ring seal 18 between the fuel stem 17 and lower end of the hub 14 and the O-ring seal 19 on the lower end of the fuel stem 14 together prevent gaseous fuel from leaking into the annulus 31. O-ring seals 20, 20' between the sleeve 13 and the mating outer surfaces of the venturi body 11 restrict air from leaking into annular chamber 24. A sealed fuel passage is now created from fuel port 48, through fuel stem 17 and into hub 14. From hub 14 the fuel flows into spray bars 12 and annulus 24 where it then enters the air stream in venturi passageway 25 through ports 22 and 23.

During operation, all air entering the carburetor inlet 52 flows through the passages 25 between the spray bars 12, the venturi body 11 and the hub 14. Passages 25 have the smallest cross-sectional area for airflow through venturi insert assembly 10, which results in the highest air velocity and the lowest pressure. The fuel ports 23 in the venturi body 11 and fuel ports 22 in the spray bars 12 are located in these areas of low pressure within passages 25. As the airflow through passages 25 increases, so does the pressure drop across fuel inlet ports 22 and 23, causing increased fuel flow. Passages 25 and fuel ports 22 and 23 can be sized to maintain a near constant air/fuel ratio for various flows when a constant pressure is applied to the fuel inlet 53 of the carburetor 40. Application variables, such as fuel composition and pressure drops in the fuel and air intake plumbing, would require numerous sizes of fuel ports 22 and 23 in order to run with a constant pressure at fuel inlet 53. This problem may be reduced or overcome by over sizing the fuel ports 22 and 23 and adjusting the mixture screw 55 of the carburetor 40 to restrict fuel flow until a near constant pressure at fuel inlet 53 of the carburetor 40 is maintained through all engine loads.

The venturi insert assembly 10 has no moving parts. This eliminates or reduces the potential for unstable operation caused by interactions between the air/fuel ratio control and the conventional spring mass system of the air/fuel mixing section 140. Stable or relatively stable engine operation allows the air/fuel ratio control to achieve reduced exhaust emissions. Another advantage of the venturi insert of FIGS. 1 to 5 is that maintenance and replacement costs associated with the carburetor diaphragm are eliminated. Maintenance and replacement costs associated with the sliding surfaces of the carburetor's air/fuel mixing section are also eliminated.

The venturi insert assembly 10 is simple to install and does not require any modifications to the existing air inlet, fuel inlet, or manifold plumbing. The existing carburetor mixture screw, butterfly, and throttle linkage do not need to be modified or replaced. This significantly reduces the costs associated with installing a conventional venturi mixer that eliminates the entire carburetor assembly. A multitude of venturi inserts with various air passage and fuel port sizes can be provided for different carburetor models. This would allow the user to select the optimum air/fuel mixer for a specific engine application, resulting in better starting, smoother idle, a more consistent air/fuel mixture, and cleaner exhaust emissions.

The venturi insert assembly has a plurality of fuel inlet passages positioned around and radially across the low-pressure region of the venturi throat, distributing the fuel across the flow profile. This supplies the engine with a relatively homogenous air/fuel mixture.

Figure 6:
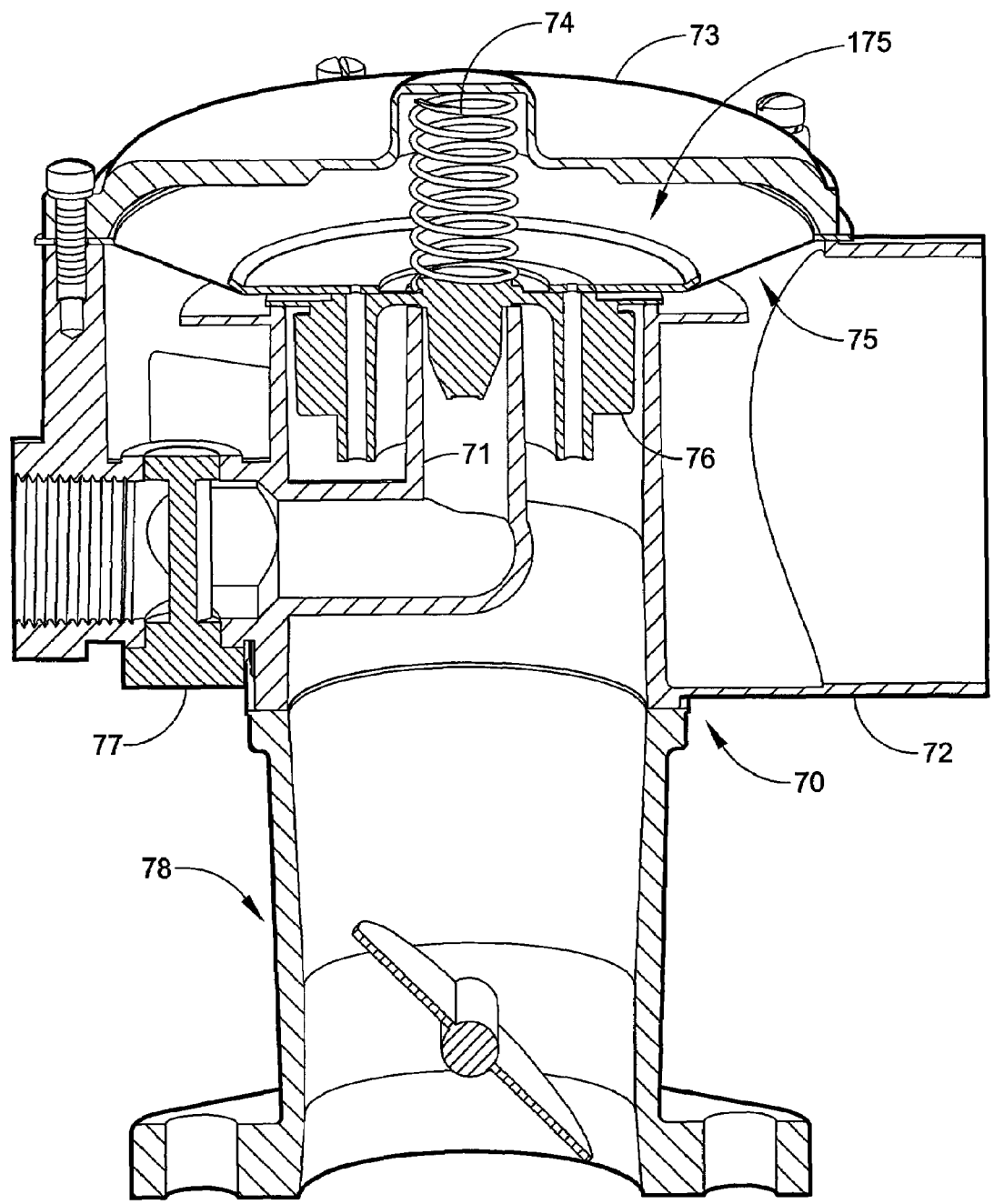
FIG. 6 is a vertical cross-sectional view of a prior art gaseous fuel carburetor with a conventional spring mass air/fuel mixer device mounted on the carburetor housing.
Figure 7:
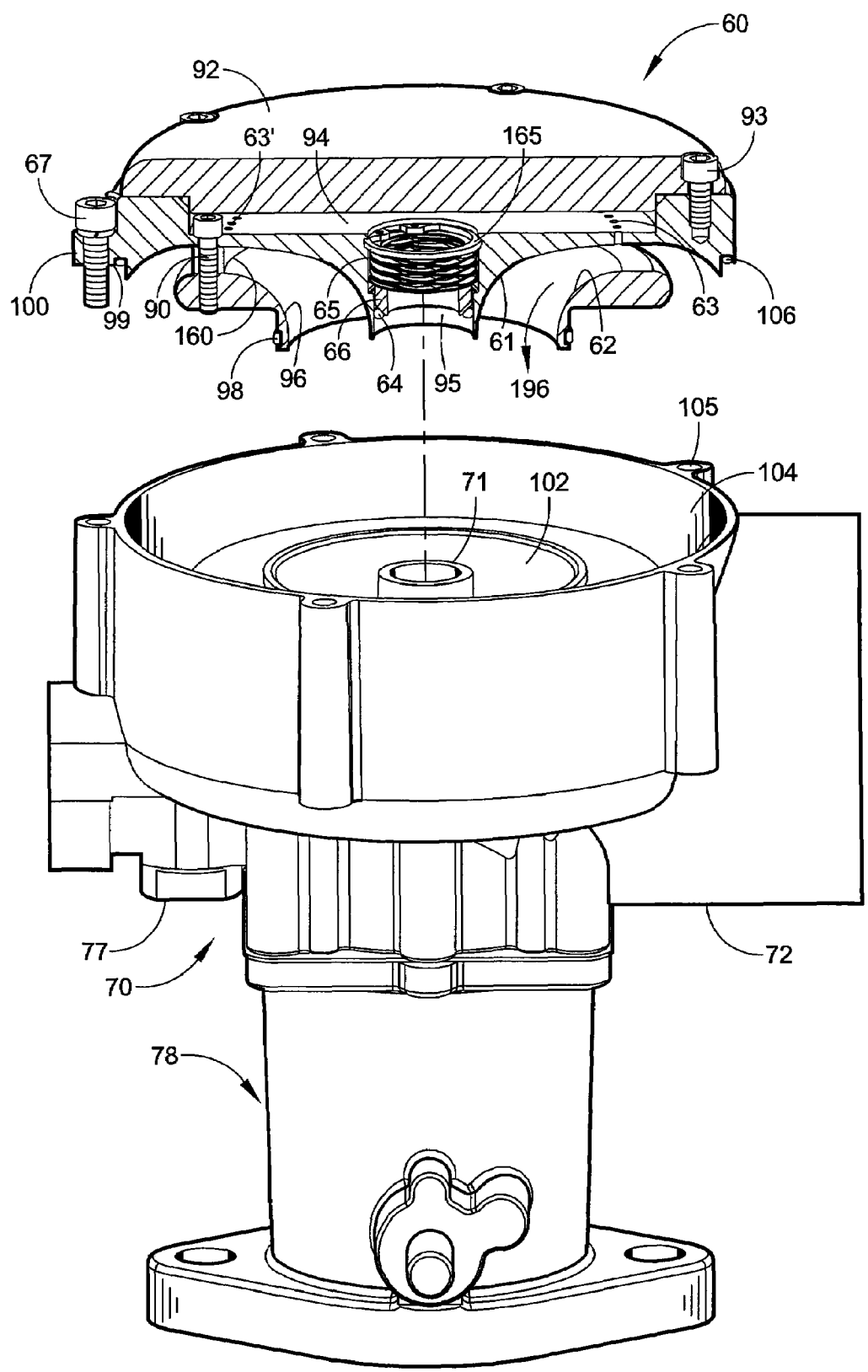
FIG. 7 is a vertical cross sectional view of the carburetor of FIG. 6 with the conventional air/fuel mixer device removed and a gaseous fuel and air mixing venturi insert device according to another embodiment positioned for mounting on the carburetor housing.
Figure 8:
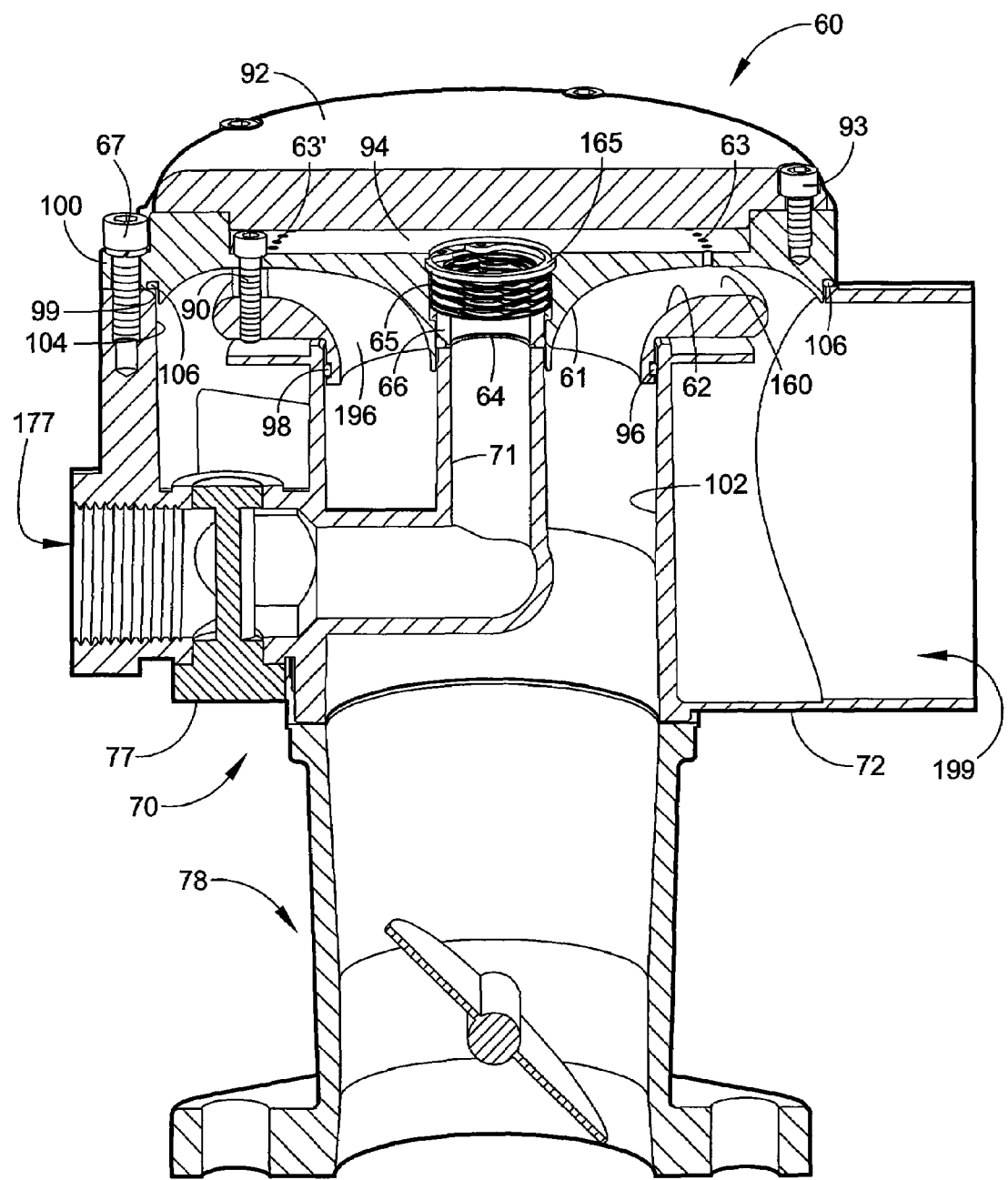
FIG. 8 is a vertical cross-sectional view similar to FIG. 7 illustrating the venturi insert device secured in position on the carburetor housing.

The alternative embodiment of FIGS. 7 and 8 shows a venturi device or venturi insert assembly 60 according to another embodiment of the invention which is designed for installation in a much smaller carburetor model 70. The prior art carburetor 70 with a conventional spring mass air and fuel mixing device 175 is illustrated in FIG. 6. In one embodiment, carburetor 70 is the carburetor design described in U.S. Pat. No. 3,123,451 and is retrofitted with the mixing venturi insert device 60 as illustrated in FIGS. 7 and 8. FIG. 7 illustrates the venturi insert device 60 separate from carburetor 70 after the existing air-fuel mixing device 60 has been removed from the seating area or housing in the upper end of carburetor 70, while FIG. 8 illustrates device 60 installed in carburetor 70.

The adapter device or venturi insert assembly 60 of FIGS. 7 and 8 has a venturi body formed by an upper inlet plate 61 and a lower inlet plate 62 secured to the upper plate by screws 90 to define a high velocity, low pressure venturi throat region 160 between the opposing surfaces of the plates. Fuel inlet ports 63 are provided in an annular ring about the upper plate 61 at the radial location having the lowest pressure. A cover plate 92 is secured over the upper plate 61 by screws 93 to define a fuel supply chamber 94 over the fuel inlet ports 63. A fuel supply passage 95 is provided through the center of plate 61 into the fuel supply chamber 94. An O-ring seal 64 is mounted at the end of seat 66 in passage 95 and is pre-loaded by a wave spring 65 located between a retainer ring 165 at the upper end of the passage 95 and the seat 66 in order to accommodate unknown dimensional tolerances of carburetor housing 72. The lower inlet plate 62 is provided with a downwardly extending annular rim 96 for mating engagement with a corresponding surface of the carburetor housing, as discussed in more detail below. O-ring seal 98 is mounted around the outer surface of rim 96. An outer annular flange or seating surface 99 is also provided on the outer edge of the upper plate 61, with a series of outwardly projecting ears or bosses 100 with fastener openings for receiving screws 67. O-ring seal 106 is mounted in a groove on flange or seating surface 99. Annular rim 96, seating surface 99 and passage 95 together form mating seating formations for seating against corresponding surfaces of the carburetor housing after removal of an existing air-fuel mixing section.

Before installing the insert assembly 60 into the carburetor 70, the user first removes the existing mixing device. As noted above, FIG. 6 illustrates the carburetor 70 with a conventional mixing device 175 installed. In order to install venturi insert assembly 60, the user first removes the cover 73, the spring 74, the diaphragm assembly 75, and the air/fuel valve 76 of the mixing device from the carburetor of FIG. 6. Insert assembly 60 is then aligned with the open upper end or seating recess of the carburetor housing 72 so that the fuel supply passage 95 is aligned with the fuel inlet port 71 and the rim 96 is aligned with passageway 102, as indicated in FIG. 7. At the same time, the seating surface 99 is aligned with fuel-air mixer seating rim 104 of the outer wall of the carburetor housing 72, and the ears 100 are aligned with corresponding ears 105 which project outwardly from the seating rim. The insert assembly is then lowered into engagement with the carburetor housing so that rim 99 engages carburetor housing rim 104, a downwardly projecting portion of rim 99 is engaged inside rim 104, rim 96 extends into passageway 102, and the lower end of the passageway 95 extends over the fuel inlet port 71, as illustrated in FIG. 8. The insert assembly is then fastened to the carburetor housing 72 with the screws 67. The existing fuel mixture screw 77 and butterfly assembly 78 of carburetor 70 are still used when the venturi insert 60 is installed.

The physical configuration of the insert device of this embodiment requires significant changes in order to fit the space constraints of the carburetor of FIG. 6, but the function and benefits remain the same as for the first embodiment. In this embodiment, a high velocity, low-pressure venturi throat region 160 is created between the upper inlet plate 61 and the lower inlet plate 62. The fuel inlet ports 63 are evenly distributed around throat region 160 along the radial location having substantially the lowest pressure, i.e. the region having the lowest cross sectional area, and therefore the highest air velocity and lowest pressure. All fuel entering the venturi insert still uses the existing fuel inlet port 71 of the carburetor 70. The O-ring seal 64 is preloaded by the wave spring 65 and seat 66 in order to accommodate unknown dimensional tolerances of carburetor housing 72. The resulting assembly 60 still provides all the same features and improvements of the first embodiment: no moving parts, reduced maintenance, simple installation, more sizing options, and improved air/fuel mixing.

In operation, air enters the carburetor through air inlet 199 (FIG. 8) and flows through the venturi inlet into venturi throat region 160. At the same time, fuel enters through carburetor fuel inlet 177 and flows through inlet port 71 and aligned fuel supply passage 95 into the fuel chamber 94 between cover 92 and upper plate 61. From chamber 94, fuel is sprayed through ports 63 into the lowest cross-sectional area portion of venturi throat 160, where it mixes with the high velocity air flowing through throat 160. The air-fuel mixture then enters butterfly assembly 78 through the venturi outlet 196 and carburetor outlet 102.

As in the previous embodiment, rather than completely replacing an existing carburetor with a mixing venturi, the venturi mixing device of this embodiment replaces only the existing spring load/diaphragm mixing device and otherwise is retrofitted to the existing carburetor body, therefore requiring no modification of the engine's air intake system. The existing carburetor butterfly assembly and fuel mixture screw can still be used and do not have to be replaced.

Figure 9:
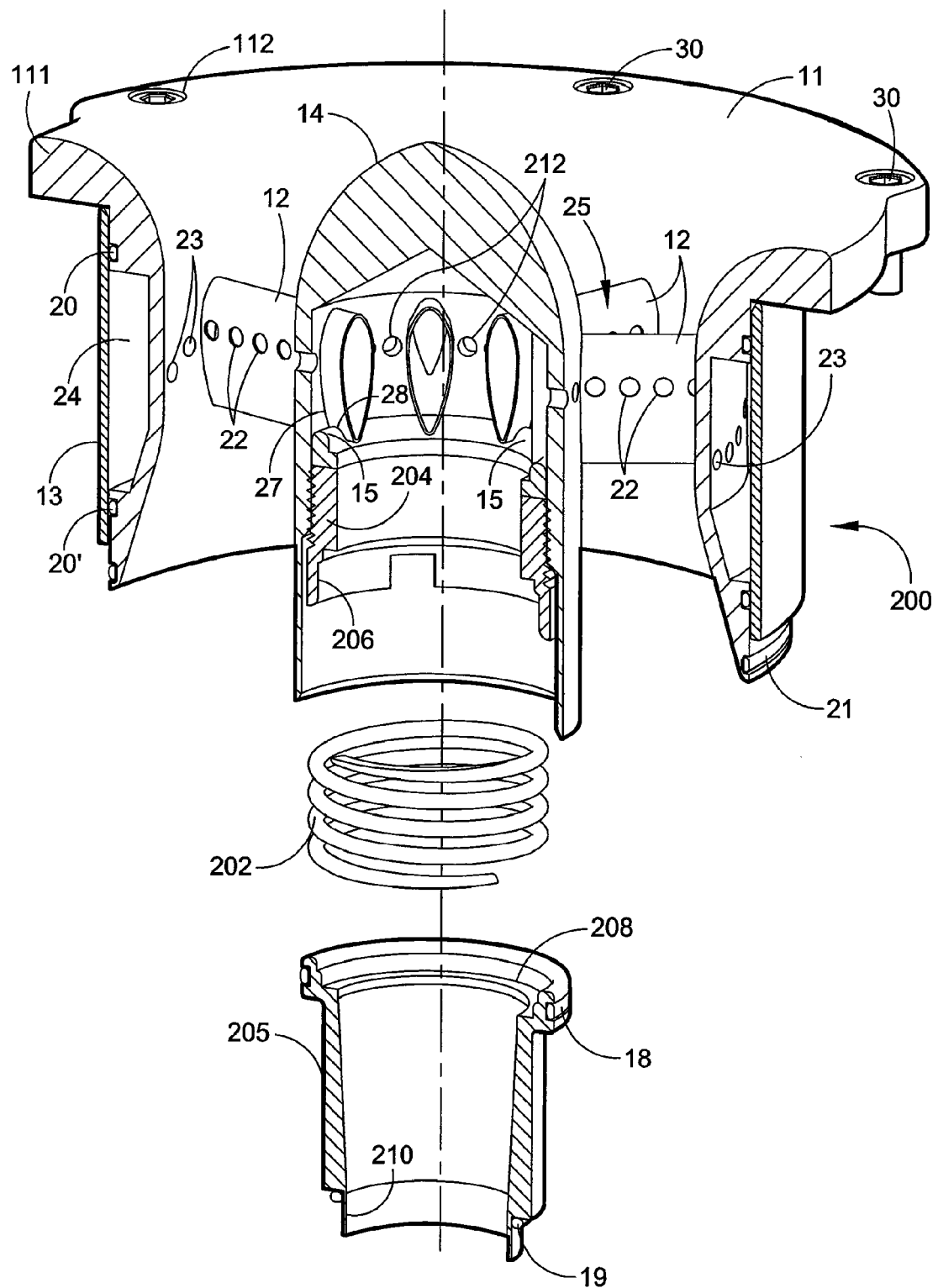
FIG. 9 is a vertical cross-sectional view similar to FIG. 4 illustrating a modified venturi insert device according to another embodiment.

FIG. 9 illustrates a modified venturi mixing device 200 which is similar to the device 10 of FIGS. 1 to 4 but which has a different fuel stem configuration. Other parts of the mixing device 200 are identical to those of device 10, and like reference numerals have been used for like parts as appropriate. In this embodiment, a compression spring 202 is provided for mounting between retainer nut 204 and fuel stem 205. The retainer nut 204 is similar to nut 16 of FIGS. 1 to 4 but has a spring seat portion or counter bore 206 at its lower end to accommodate the spring. The upper end of fuel stem 205 is also modified to provide a seat or counter bore 208 to receive the end of the spring. O-ring seal 18 is mounted in a groove on the outside of the spring seat 208. The lower end of the fuel stem is also modified to eliminate shoulder 29 and instead has a reduced diameter end portion 210 for fitting into existing seat 47 at fuel port 48 of the butterfly assembly 50, as described in more detail below. Another modification in this embodiment is that additional fuel ports 212 are provided around hub 14 in alignment with ports 22 and 23, for additional fuel supply into venturi throat 25. Ports 212 may also be added in the embodiment of FIGS. 1 to 4.

Figure 10:
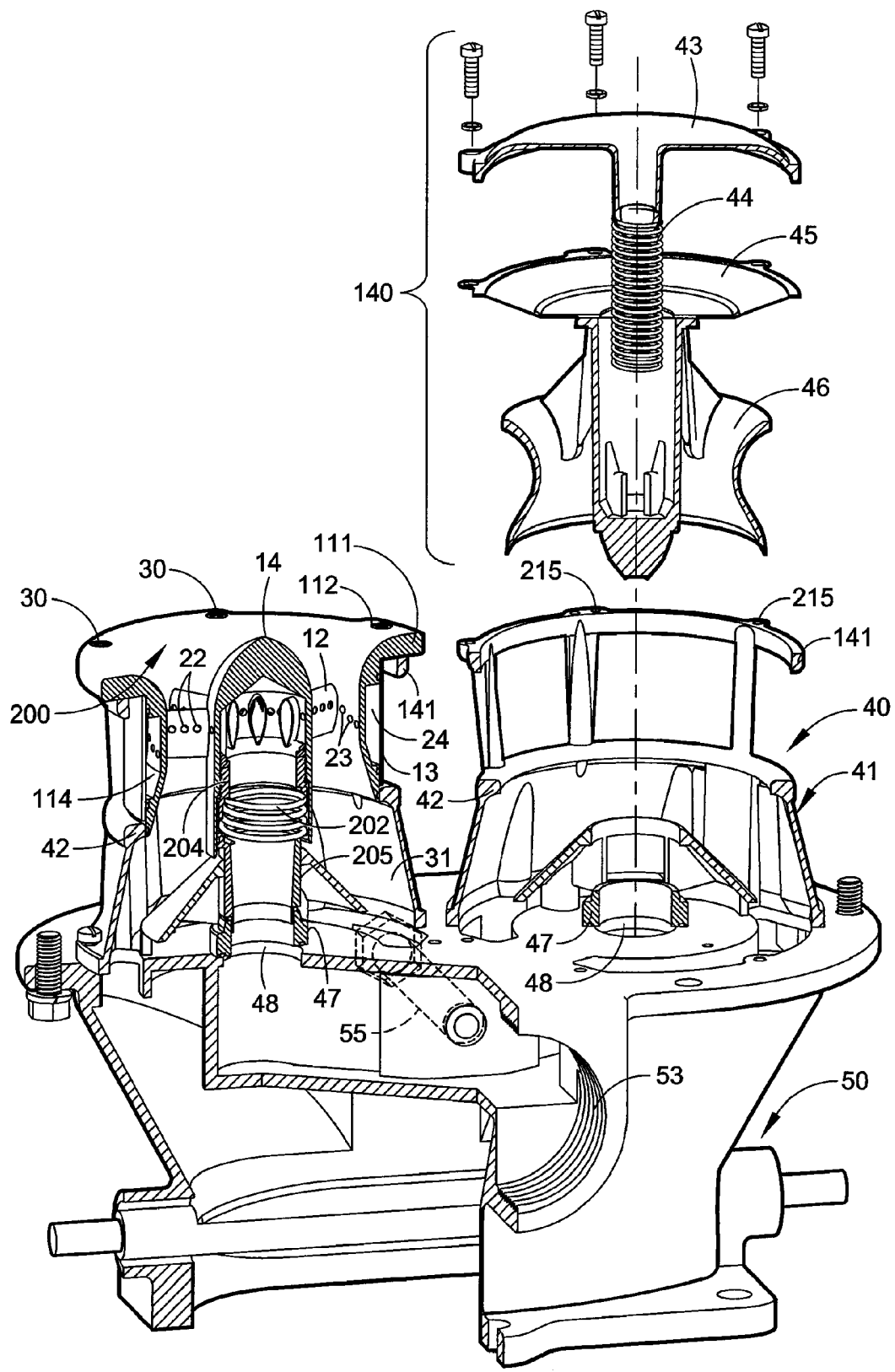
FIG. 10 is a cross-sectional view of a gaseous fuel carburetor housing similar to that of FIG. 5 with the venturi insert or adapter device of FIG. 9 replacing one of the air/fuel mixers, and a conventional air/fuel mixer removed from the carburetor on the right hand side prior to replacement with another venturi insert device.

FIG. 10 illustrates a carburetor 40 of the same design to FIG. 5 with the hood 54 removed for illustration purposes. As in FIG. 5, carburetor 40 has dual fuel-air mixing devices and associated support members or housings 41 above the butterfly assembly 50. In FIG. 10, the existing spring mass/diaphragm mixing device 140 has been removed from one of the housings 41 and replaced with venturi insert device 200. The other existing mixing device 140 is shown separated from the housing 41 prior to seating of a second venturi insert device. One difference between the venturi insert device 200 and that of FIGS. 1 to 4 is that the housing 41 and valve seat 47 do not have to be removed before installing the venturi insert device. Instead, only the components of spring mass/diaphragm device 140 have to be removed, specifically cover 43, spring 44, diaphragm assembly 45, and air fuel valve 46. After these components are removed, the fuel stem 205 is aligned with fuel port 48 of the butterfly assembly and lowered into the housing 41 until the smaller diameter end portion 210 is seated inside valve seat 47 with O-ring seal 19 bearing against the upper end of the valve seat. The spring 202 is then seated in the spring seat 208 and the upper portion of the venturi insert device is then lowered into housing 41 with hub 14 aligned with fuel stem 205 and the lower end of the hub engaging over the fuel stem as indicated in FIG. 10.

At this point the lower rim of venturi body 11 engages inside the flange 42 of support member or housing 41, and the upper flange 111 seats over the upper rim 141 of the housing 41, with fastener openings 215 on rim 141 aligned with corresponding openings 112 around the flange 111 for receiving fastener screws 30. Spring 202 is compressed to force the lower fuel stem O-ring 19 against the seat 47. This arrangement accommodates different dimensional tolerances of the carburetor 40. The lower rim of the venturi body is sealed against flange 42 by O-ring 21 as in the first embodiment, and O-ring seal 18 provides a seal between the upper end of fuel stem 205 and the lower end of hub 14.

Operation of the assembly of FIG. 10 is similar or identical to that described above in connection with FIG. 5.

Figure 11:
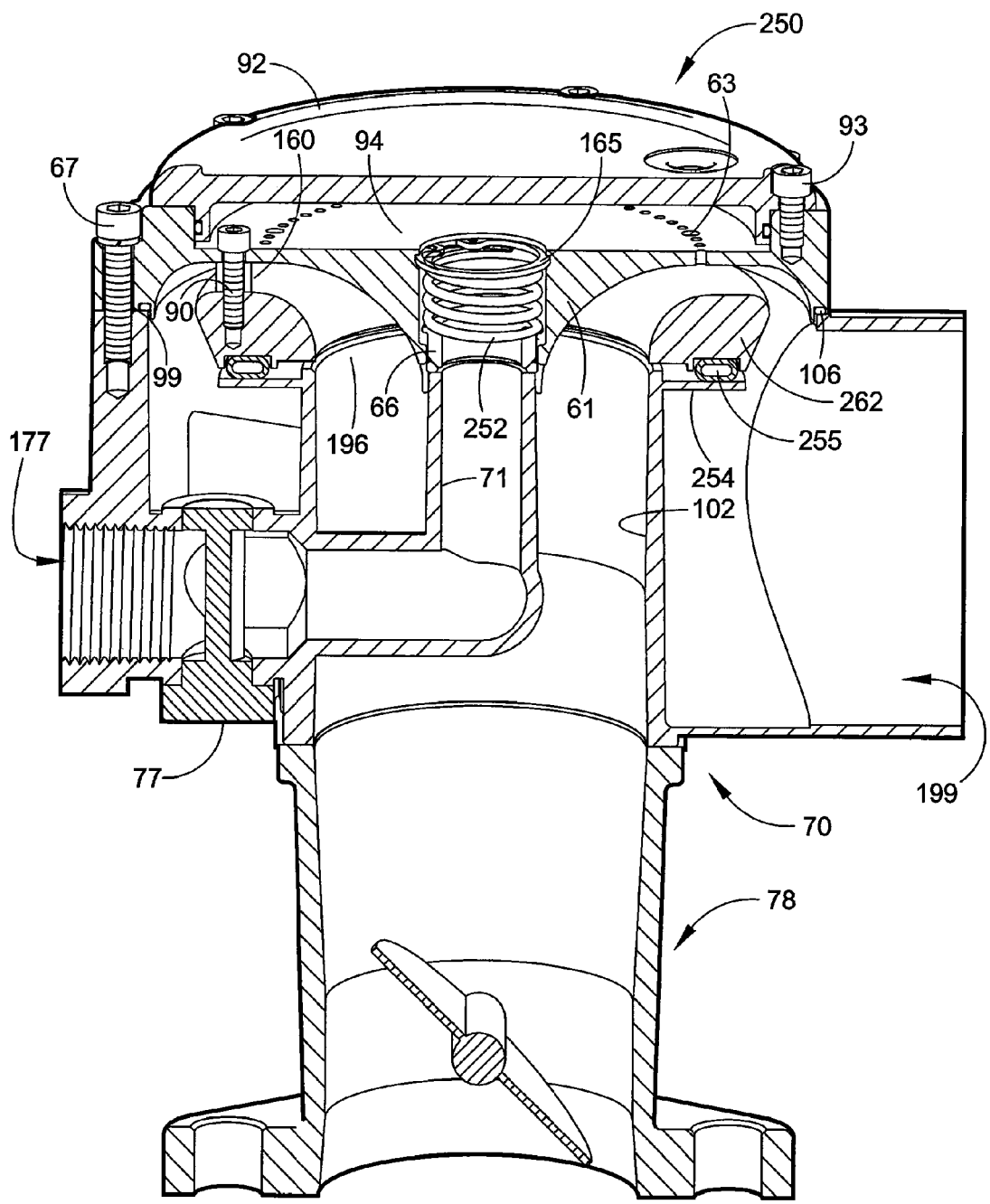
FIG. 11 is a vertical cross sectional view of a carburetor similar to FIG. 8 but with a modified venturi insert device according to another embodiment.
Figure 11A:
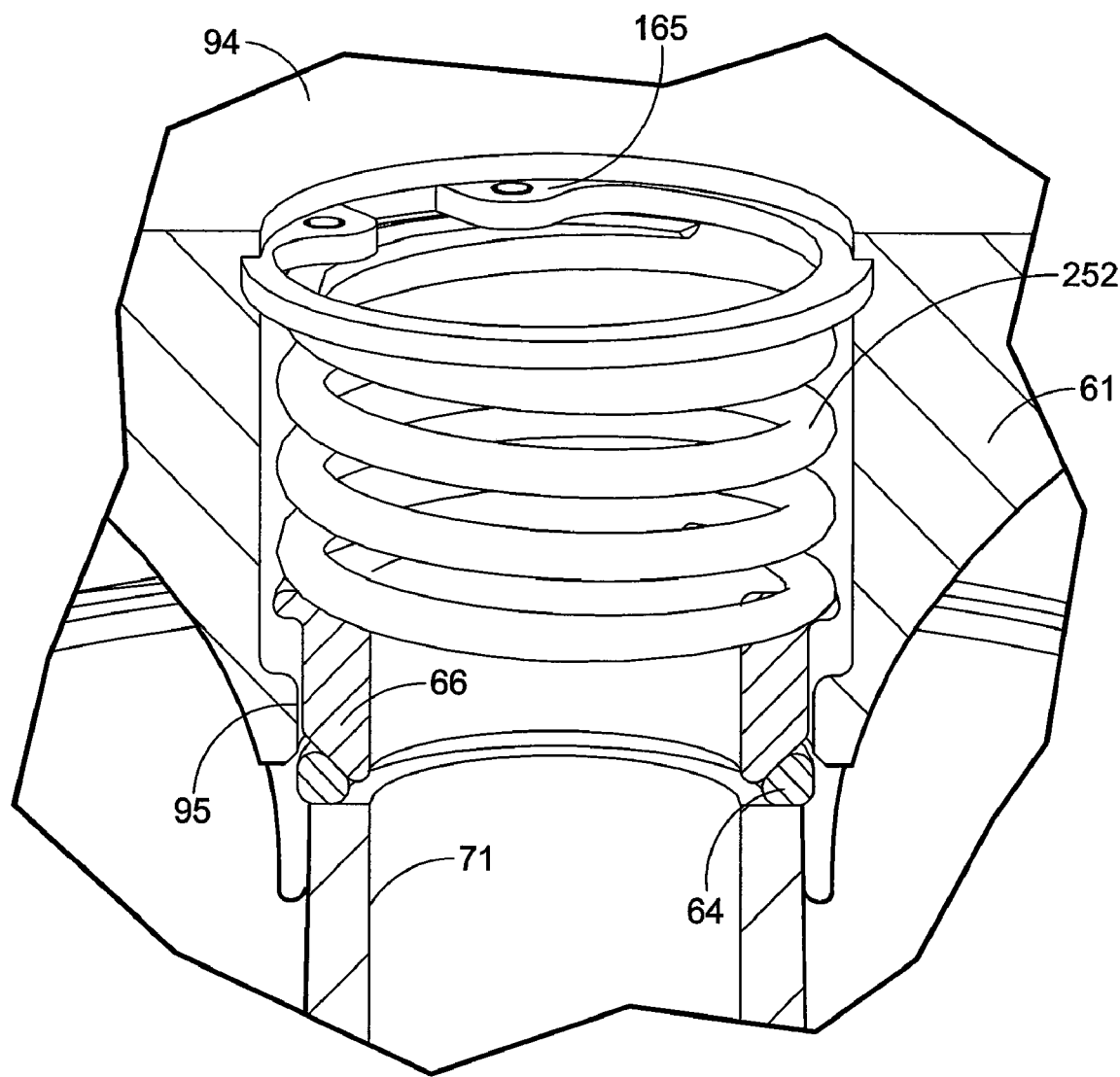
FIG. 11A is an enlarged view of the venturi fuel supply passageway of FIG. 11.
Figure 12:
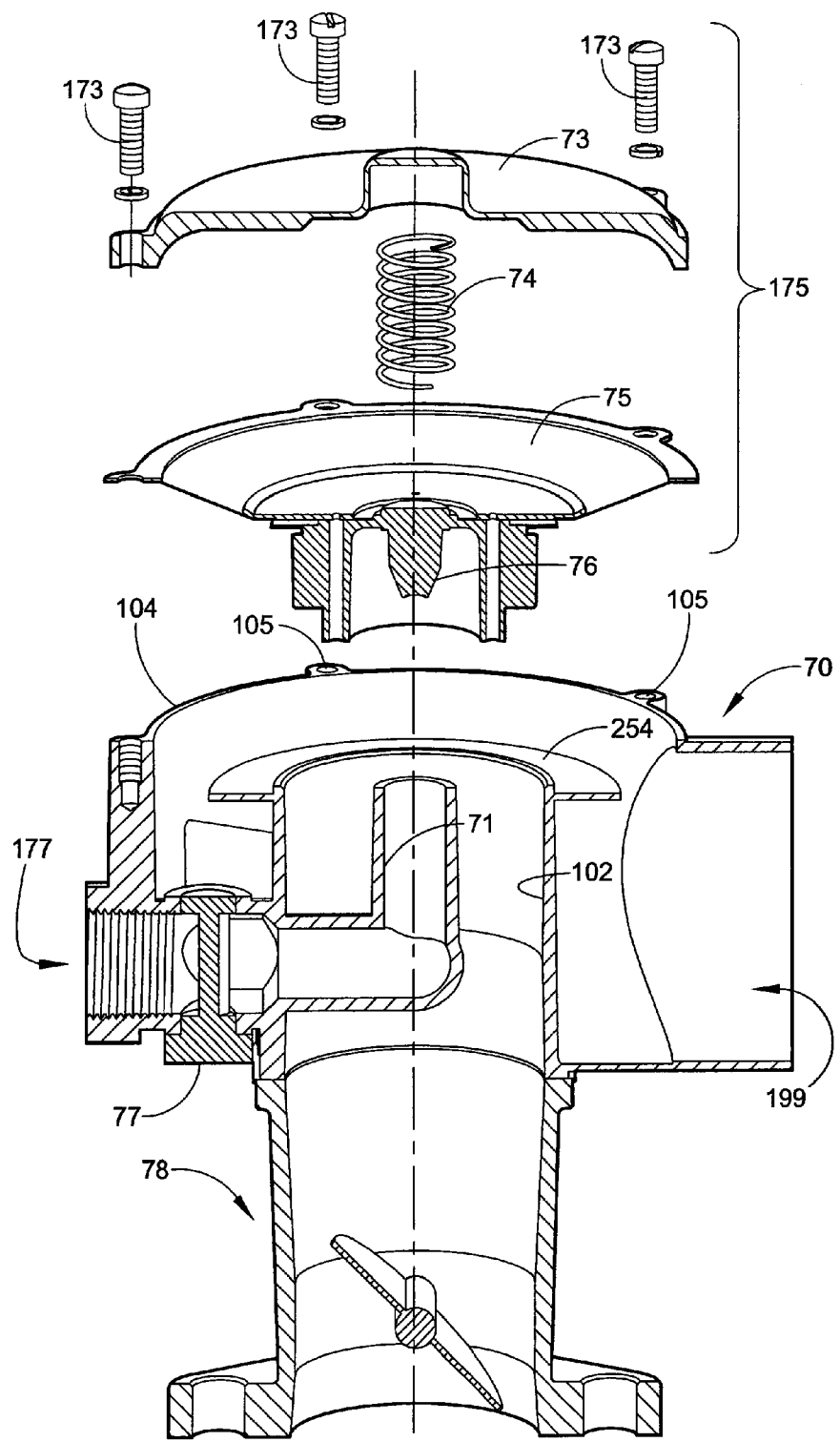
FIG. 12 is an exploded view of the components of a conventional air/fuel mixer removed from the carburetor prior to replacement with a venturi insert device.

FIGS. 11 and 11a illustrate a modified embodiment of venturi insert device 250 for mounting on a smaller carburetor 70 in a manner similar to venturi insert device 60 of FIGS. 7 and 8. FIG. 11 illustrates insert device 250 installed on the carburetor 70 in place of the previous spring mass/diaphragm mixing device 175, which is shown separated from the carburetor 70 in FIG. 12. Some parts of venturi insert device 250 are identical to the device 60 of FIG. 7 and like reference numerals have been used for like parts as appropriate. However, wave spring 65 of device 60 is replaced by a compression spring 252, which is a less expensive part. As illustrated in FIG. 11A, compression spring 252 is mounted in fuel supply passageway 95 between retainer ring 165 and sliding seat 66 so as to bias seal 64 into sealing engagement with the upper end of fuel insert port 71. Additionally, the lower plate 262 of the venturi body has a modified lower face for seating against flange 254 of the carburetor passageway 102 which leads to the butterfly assembly. In this embodiment, a seal member 255 seated in an annular groove in the lower face of plate 262 is pressed against flange 254 to form a seal when screws 67 are tightened. Seal 255 eliminates the need for rim 96 and seal 98 of the embodiment of FIGS. 7 and 8.

Retrofitting of carburetor 70 with venturi insert device 250 is similar to the retrofitting with device 60 as described above in connection with FIGS. 7 and 8. The fastener screws 173 are removed to allow the cover 73, the spring 74, the diaphragm assembly 75, and the air/fuel valve 76 of the existing mixing device 175 to be removed from the carburetor. Insert assembly 250 is then aligned with the open upper end of the carburetor housing 72 so that the fuel supply passage 95 is aligned with the fuel inlet port 71 as indicated in FIG. 11. At the same time, the seating surface 99 is aligned with surface or seating rim 104 of the outer wall of the carburetor housing 72, and the ears 100 are aligned with corresponding ears 105 which project outwardly from the outer wall as indicated in FIG. 7. The insert assembly is then lowered into engagement with the carburetor housing so that rim 99 is engaged inside wall 104, and the lower end of the passageway 95 extends over the fuel inlet port 71, as illustrated in FIG. 8. The insert assembly is then fastened to the carburetor housing 72 with the screws 67.

Operation of venturi insert or fuel-air mixing device 250 of FIG. 11 is identical to that described above in connection with FIGS. 7 and 8.

The key difference between a stock or conventional carburetor and one with a venturi insert device installed as in the above embodiments is that all dynamic or moving components of the air fuel mixing section are eliminated. This lowers maintenance costs, improves stability, and decreases exhaust emissions.

Stand-alone venturi mixers are known in the field for completely replacing existing gaseous fuel carburetors. Replacing the entire carburetor with a stand-alone venturi mixer typically requires costly and time consuming modifications to the air inlet, fuel inlet, manifold plumbing, throttle linkage, and the like. Additional hardware such as throttle valves and mixture screws may be required. In contrast, the venturi insert assembly of the above embodiments can be installed relatively quickly in an existing carburetor housing, without any plumbing modifications, and at a lower cost.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A venturi insert device for a gaseous fuel carburetor, comprising:

a venturi body with a passage for air flow through the venturi body, the passage having an air inlet end, a fuel-air mixture outlet end, and a venturi throat of reduced cross-sectional area;

the venturi body being of predetermined shape and dimensions adapted for seating engagement with a carburetor such that the air inlet end communicates with an air inlet of the carburetor and the fuel-air mixture outlet communicates with the outlet of the carburetor;

the venturi body having an outer flange of predetermined dimensions adapted for engagement with a fuel-air mixer seating rim of a carburetor housing;

the venturi body having a fuel inlet port adapted for communication with a fuel supply port of the carburetor;

a cover member extending over part of the venturi body to define a fuel supply chamber between the cover member and venturi body, the fuel supply chamber communicating with the fuel inlet port;

a plurality of fuel supply openings in the venturi body connecting the fuel supply chamber with the venturi throat; and fastener devices adapted to secure the venturi body to the carburetor housing.

2. The device of claim 1, wherein the fuel supply openings are provided at spaced intervals in a ring around the venturi throat.

3. The device of claim 1, wherein the venturi throat has a region of minimum cross-sectional area, and the fuel supply openings are located at said region.

4. The device of claim 1, further comprising a seal device on the fuel inlet port adapted for sealing between the fuel inlet port and carburetor fuel supply port when the device is mounted in a carburetor.

5. The device of claim 4, further comprising a biasing device in the venturi body adapted to bias the seal device into sealing engagement with the carburetor fuel supply port.

6. The device of claim 1, wherein the venturi body has an outer sleeve portion and a central hub portion, the venturi throat being defined between the outer sleeve portion and central hub portion, the cover member comprising an outer sleeve mounted over the outer sleeve portion, the fuel supply chamber comprising an annular chamber between the outer sleeve and outer sleeve portion, and the fuel supply openings comprising an annular ring of openings around the outer sleeve portion.

7. The device of claim 6, wherein the central hub portion is hollow and the fuel inlet port comprises an open end of the central hub portion, and a plurality of hollow spray bars extend radially between the central hub portion and outer sleeve portion, each spray bar communicating with the interior of the central hub portion and with the fuel supply chamber, and having a series of spaced fuel supply openings along its length.

8. The device of claim 7, further comprising a series of spaced fuel supply openings extending in a ring around the central hub portion.

9. The device of claim 7, wherein each spray bar has opposite side walls and fuel supply openings are provided in both side walls of each spray bar.

10. The device of claim 1, further comprising a fuel stem extending from the fuel inlet port and adapted for releasable sealing engagement with the carburetor fuel supply port when the venturi body is secured in a carburetor housing.

11. The device of claim 10, wherein the fuel stem has a reduced diameter end portion for engagement in a valve seat of the carburetor fuel supply port.

12. The device of claim 11, further comprising a seal member engaging over the reduced diameter end portion for sealing engagement between the valve seat and fuel stem.

13. The device of claim 10, wherein the fuel stem is separate from the venturi body, and is adapted for releasable connection between the fuel inlet port of the venturi body and the carburetor fuel supply port.

14. The device of claim 13, further comprising a biasing member between the fuel inlet port and fuel stem.

15. The device of claim 1, wherein the venturi body comprises first and second opposing plates defining the venturi throat between opposing inner faces of the plates, and a cover plate secured over the first plate to define the fuel supply chamber between the cover plate and first plate, the fuel supply openings being located in a ring around the first plate at a location corresponding to the venturi throat.

16. The device of claim 1, wherein the outer flange of the venturi body has a plurality of fastener openings adapted for alignment with corresponding openings in the seating rim of a carburetor housing when the device is in seating engagement with the carburetor, the fastener devices being adapted to extend through the aligned openings to releasably secure the venturi body to the carburetor.

17. The device of claim 1, wherein the fuel inlet port is adapted for engagement over the carburetor fuel supply port.

* * * * *